Dec. 10, 1963

L. A. HENDLEY 3,113,587

BALL CHECK VALVE SEAT ASSEMBLY

Filed June 9, 1961

Lloyd A. Hendley
INVENTOR.

BY *Clarence A. O'Brien*
*and Harvey B. Jackson*
Attorneys

United States Patent Office 3,113,587
Patented Dec. 10, 1963

3,113,587
BALL CHECK VALVE SEAT ASSEMBLY
Lloyd A. Hendley, 815 N. Sherman St.,
North Mankato, Minn.
Filed June 9, 1961, Ser. No. 116,138
3 Claims. (Cl. 137—519.5)

This invention relates to a one-way check valve assembly which features means to prevent sticking of the valve element when forcibly seated on the valve seat of the valve assembly when preventing reverse flow through the valve assembly.

It is therefore a primary object of this invention to provide a one-way check valve assembly of the type which includes a ball valve element made of elastic materials, and which valve assembly will be operative to prevent reverse flow therethrough and yet never stick as a result thereof. The present invention achieves its purpose in an extremely simple, yet unique manner. The one-way check valve assembly therefore consists of a valve seat member within which there is formed a narrow portion contiguous with outwardly flaring conical seat portions, one of which receives the ball valve element. The ball valve element will therefore be of a diameter intermediate the narrow diameter portion of the valve seat and the axial end portion thereof so that the ball valve will become seated in response to reverse flow through the valve assembly upon the conical surface of the valve seat in order to close off the valve and thereby prevent said reverse flow. Where large reverse flow surges are present, such ball valve elements have heretofore become wedged in the valve seat inasmuch as the ball valve element is necessarily made elastic so as to not mar the harder valve seat surface so that a fluid sealing closure action may be achieved. However, as a result of the ensuing deformation of the ball valve element when seated upon the valve seat surfaces, considerable pressure in the direction of flow was often required before unseating of the valve occurs, causing malfunctioning of the fluid flow system within which the one-way check valve is associated. The problem with the sticking ball valve element is of particular concern where fluent material such as plaster, cement and other emulsified materials are handled by the fluid flow system with which the ball valve assembly is associated. By a simple yet highly effective means sticking of the ball valve element may be prevented without the use of complex corrective mechanisms, through practice of the present invention. Accordingly, a pin is mounted transverse to the direction of flow on that side of the valve seat opposite to the ball valve element whereby the extent that the ball valve element projects beyond the central narrow portion of the valve seat member, is limited. As a result thereof, the ball valve element can never become wedged through the narrow portion of the valve seat and deformation in an axial direction so limited thereby to prevent sticking.

It is therefore another object of this invention to provide means for limiting displacement of a one-way check ball valve through the narrow portion of the valve seat with which it is associated and thereby preventing sticking of the ball valve element within the valve seat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
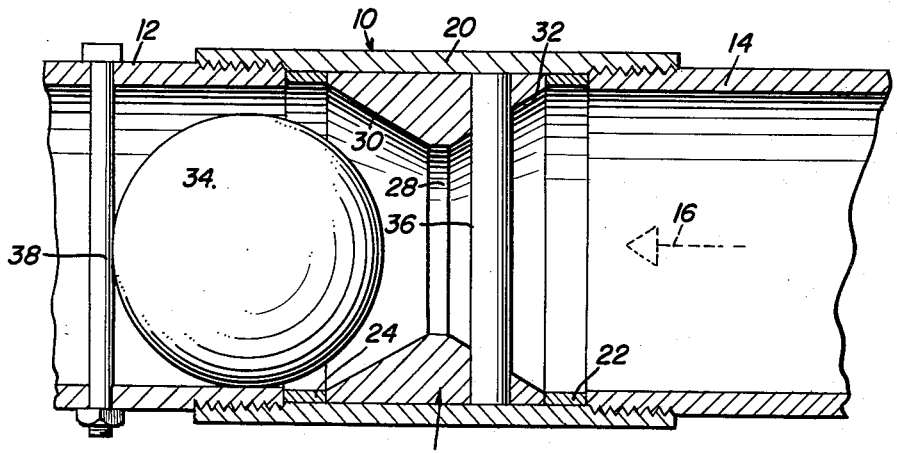
FIGURE 1 is a partial sectional view through a one-way valve assembly made in accordance with the present invention shown in its valve open condition.

Referring now to the drawing in detail, it will be observed that the valve assembly of the present invention which is generally referred to by reference numeral 10 is shown installed between two adjacent ends of flow conduits 12 and 14 through which liquids and fluent materials such as plaster, cement or the like may flow in one direction as indicated by arrow 16 in FIGURE 1. The valve assembly 10 is provided between the conduits 12 and 14 so as to prevent flow in the reverse direction as indicated by arrow 18 in FIGURE 2. The valve assembly 10 may therefore be associated for example with a pump discharge wherein it is desired to prevent reverse flow back into the pump by virtue of high pressures that may be developed on the downstream side of the valve assmebly 10 within the conduit 12. Other uses of the one-way check valve assembly 10 will of course be apparent to those skilled in the art.

Figure 2:
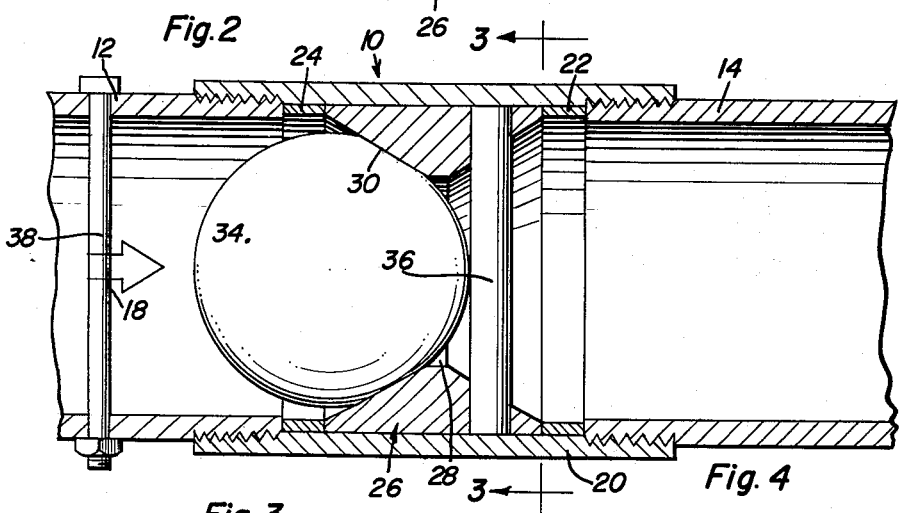
FIGURE 2 is a partial sectional view through the valve assembly of the present invention showing the valve assembly in its valve closed position.
Figure 3:
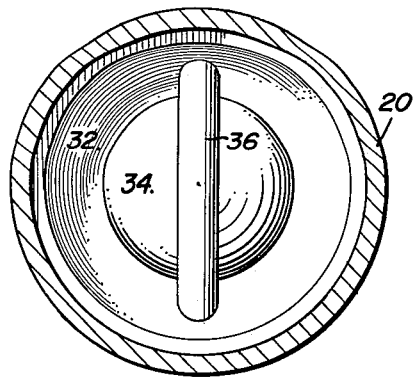
FIGURE 3 is a sectional view taken substantially through a plane indicated by sectional line 3—3 of FIGURE 2.

The valve assembly 10 includes a cylindrical mounting member or sleeve 20 by means of which the valve assembly may be attached to the adjacent ends of the conduits 12 and 14 with which it is associated. Threaded connections are illustrated in FIGURES 1 and 2, but it will be appreciated that any other suitable connection may be provided with the proper sealing qualities. Fixedly mounted within the cylindrical member 20 and spaced from the adjacent axial ends of the conduits 12 and 14 by spacer rings or members 22 and 24, is a valve seat member generally referred to by reference numeral 26. The valve seat member includes a cylindrical ring or central portion 28 which constitutes the throat of the valve assembly and is of minimum internal diameter. Contiguous with the central portion 28 are outwardly flaring conical or frusto-conical portions 30 and 32 which terminate at opposite axial ends of the seat member 26 with maximum internal diameter dimensions. It will be appreciated that the conical portion 30 constitutes the valve seat portion and hence is formed with a relatively hard surface so that it will resist deformation and scratching in order to provide a fluid tight seal upon closing of the valve assembly.

The valve assembly is therefore closed when the ball valve element 34 is seated on the valve seat portion 30 as indicated in FIGURE 2. Seating of the ball valve element 34 occurs in response to reverse flow as indicated by arrow 18. Inasmuch as the ball valve element must necessarily be elastic with respect to the valve seat member 26, the ball valve element will be made of steel, plastic or any other such material. It will also be appreciated that the size of the valve seat dimensions and that of the ball valve element will vary depending upon the use to which the valve assembly 10 is being put. However, the diameter of the ball valve element 34 must necessarily be intermediate the minimum diameter of central portion 28 and the maximum diameter of the valve seat member 26 or the internal diameter of the conduit 12. Accordingly, the ball valve element 34 when seated upon the valve seat portion 30 will become wedged thereupon and a portion of the ball valve will project through the central portion 28.

Should the ball valve element 34 become so deformed and wedged on the valve seat portion 30, sticking would occur requiring considerable pressure to unseat the ball valve. Since such an occurrence may cause improper functioning of the fluid system with which the valve assembly 10 is associated, mechanism is required in order to prevent such sticking from occurring.

In order to prevent the aforementioned sticking of the ball valve 34, a limit pin 36 is fixedly mounted diametrically in aligned openings provided therefor in the seat member 26 within the portion 32 on the side of the central portion 28 opposite the portion 30. The pin 36 is therefore disposed transversely with respect to the direction of flow and is spaced a short distance from the central portion 28 so that the ball valve 34 will strike the pin 36 when it is seated and thereby prevent any further deformation of the ball valve in an axial direction that would tend to cause sticking thereof.

In order to prevent the valve ball 34 from leaving the valve mechanism when flow occurs, the removable pin or bolt 38 is provided on the downstream side of the valve mechanism sufficiently spaced therefrom to permit valve opening movement of the ball 34. The pin 38 is removably mounted so as to permit ball replacement from the downstream side.

Figure 4:
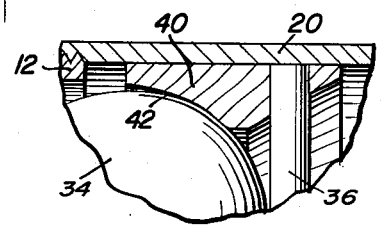
FIGURE 4 is a partial sectional view showing a modified form of valve seat.

It will be further appreciated that the valve seat surface may be of various shapes other than the conical surface 30 as shown in FIGURES 1 and 2, depending upon the use of the valve and the material flowing therethrough. For example, a concave surface 42 may be formed on the valve seat member 40 as illustrated in FIGURE 4.

From the foregoing description, operation and utility of the novel feature of the present invention will be apparent. A highly effective and simple method has therefore been disclosed for use with one-way check valve assemblies of the type hereinbefore described that will avoid a serious problem in the operation thereof without resorting to any expensive or complicated corrective mechanism.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A one-way check valve assembly comprising a valve seat member having a central portion of minimum internal diameter contiguous with outwardly flaring conical portions terminating at opposite axial ends adapted to be connected to flow conduits, a ball valve element disposed on one side of the central portion for engagement with the valve seat member on said one side thereof and of a diameter intermediate the internal diameters of said central portion and the axial ends of the valve seat member, a limit pin transversely mounted in the valve seat member on the other side of the central portion and spaced therefrom for contact by the ball valve element simultaneously with its engagement with said one side of the valve seat member, thereby limiting the projection of the ball valve element through said central portion and arresting said ball valve element when it seats and before it can wedge and stick in the valve seat member.

2. A check valve comprising a sleeve adapted to be interposed in a pipe line and including internally threaded end portions for threadedly receiving adjacent end portions of a pair of pipes, a cylindrical ring mounted in the sleeve in inwardly spaced relation to the end thereof, a substantially frusto-conical seat in one end portion of the ring, a pin mounted diametrically in the other end portion of the ring, and a ball engageable by fluid pressure with the seat for closing the valve, said ball further being engageable simultaneously with the pin through the ring to be arrested by said pin when said ball has seated for preventing said ball from wedging and sticking in said seat, said ring having diametrically opposite, radial openings therein receiving the end portions of the pin.

3. The combination of claim 2, together with additional rings in the sleeve for spacing the first named ring from the pipes.

References Cited in the file of this patent

UNITED STATES PATENTS

| | | |
|---|---|---|
| 343,327 | Lowrie | June 8, 1886 |
| 2,328,014 | Heigis | Aug. 31, 1943 |
| 2,424,108 | Merten | July 15, 1947 |
| 2,431,593 | Strike | Nov. 15, 1947 |
| 2,545,000 | Martin | Mar. 13, 1951 |
| 2,899,974 | Gratzmuller | Aug. 18, 1959 |
| 2,981,285 | Nilo | Apr. 25, 1961 |
| 3,077,204 | Bennett et al. | Feb. 12, 1963 |